April 9, 1963  E. O. BLODGETT  3,084,857
MOTORIZED READER FOR RECORD MEDIA
Original Filed Nov. 15, 1955  9 Sheets-Sheet 1

FIG. 1

INVENTOR.
EDWIN O. BLODGETT
BY
ATTORNEY

April 9, 1963

E. O. BLODGETT 3,084,857

MOTORIZED READER FOR RECORD MEDIA

Original Filed Nov. 15, 1955

INVENTOR
EDWIN O. BLODGETT
BY
ATTORNEY

April 9, 1963     E. O. BLODGETT     3,084,857
MOTORIZED READER FOR RECORD MEDIA
Original Filed Nov. 15, 1955     9 Sheets-Sheet 3

FIG. 3

April 9, 1963 E. O. BLODGETT 3,084,857
MOTORIZED READER FOR RECORD MEDIA
Original Filed Nov. 15, 1955 9 Sheets-Sheet 4

INVENTOR.
EDWIN O. BLODGETT
BY
ATTORNEY

April 9, 1963　　　E. O. BLODGETT　　　3,084,857
MOTORIZED READER FOR RECORD MEDIA
Original Filed Nov. 15, 1955　　　　　　　9 Sheets-Sheet 5

INVENTOR.
EDWIN O. BLODGETT
BY
ATTORNEY

April 9, 1963  E. O. BLODGETT  3,084,857
MOTORIZED READER FOR RECORD MEDIA
Original Filed Nov. 15, 1955  9 Sheets-Sheet 6

INVENTOR.
EDWIN O. BLODGETT
BY
ATTORNEY

April 9, 1963  E. O. BLODGETT  3,084,857
MOTORIZED READER FOR RECORD MEDIA
Original Filed Nov. 15, 1955  9 Sheets-Sheet 7

INVENTOR.
EDWIN O. BLODGETT
BY
ATTORNEY

April 9, 1963 E. O. BLODGETT 3,084,857
MOTORIZED READER FOR RECORD MEDIA
Original Filed Nov. 15, 1955 9 Sheets-Sheet 8

FIG. 12.

INVENTOR.
EDWIN O. BLODGETT
BY
ATTORNEY

April 9, 1963   E. O. BLODGETT   3,084,857
MOTORIZED READER FOR RECORD MEDIA
Original Filed Nov. 15, 1955   9 Sheets-Sheet 9

FIG. 13.

*INVENTOR.*
EDWIN O. BLODGETT
BY
ATTORNEY

3,084,857
MOTORIZED READER FOR RECORD MEDIA
Edwin O. Blodgett, Rochester, N.Y., assignor to Commercial Controls Corporation, Rochester, N.Y., a corporation of Delaware
Original application Nov. 15, 1955, Ser. No. 546,902, now Patent No. 2,927,158, dated Mar. 1, 1960. Divided and this application Mar. 2, 1959, Ser. No. 796,682
8 Claims. (Cl. 235—61.11)

The present invention relates to motor driven coded information readers for deriving information recorded in a record medium by use of a code employing a preselected maximum number of code bits arranged in combinational groups each representing an information item such as an alphabetic character, a number, a symbol, or an operational function desired in effecting printing of the information. While the invention is of general application, it is particularly suited for use in reading punched-code tape and will be described in that connection.

The present application is a division of U.S. Patent No. 2,927,158, granted March 1, 1960, to Edwin O. Blodgett and entitled Code-Form Converter.

There are many present-day applications where information is recorded in punched tape by use of an appropriate punch code. These punched tape records are then used to control the operations of code transmitters for purposes of transmitting the information to a remote point, to control the operations of printers for purposes of printing the information, to supply information to computers, and for numerous other well-known purposes. The tape reader used to read these punched tapes may have any of a large number of various proposed constructions most of which, however, contemplate that the reader shall form a component of and be driven by the machine with which the reader is used.

It would be desirable to have a relatively compact, rugged and inexpensive motorized reader unit adaptable with minimum constructional changes to various and diverse types of application while housing certain control-system components required in such applications. Further, and to enhance the very high rate of information reading desired, it would be desirable that the motorized drive control of the coded-information reader be accomplished in an exceptionally rapid and precise manner consistently accurate and reliable over long operating periods without requiring maintenance attention. These several desirable characteristics present rather severe constructional and operational problems in regard to the necessarily relatively sensitive code reader unit, which often must not only possess a relatively high reading rate but must also permit reading and temporary storage of each read code awaiting its utilization by associated equipment and yet must accomplish such storage in a simple yet reliable manner and one characterized by high operational precision.

It is an object of the present invention to provide a new and improved coded-information, motorized, reader unit possessing a high degree of accuracy and reliability in operation and one exhibiting high rates of information handling capacity.

It is a further object of the invention to provide a novel coded-information, motorized, reader unit of relatively inexpensive, rugged and compact construction readily adaptable with a minimum of simple constructional changes to numerous and diverse applications and one which is suitable for housing control-system components required in such applications.

It is a further object of the invention to provide a new and improved motorized code reader unit characterized by high information handling capacity and high operational precision while at the same time accomplishing storage of read information for brief intervals in an exceptionally simple yet reliable manner.

Figure 1:
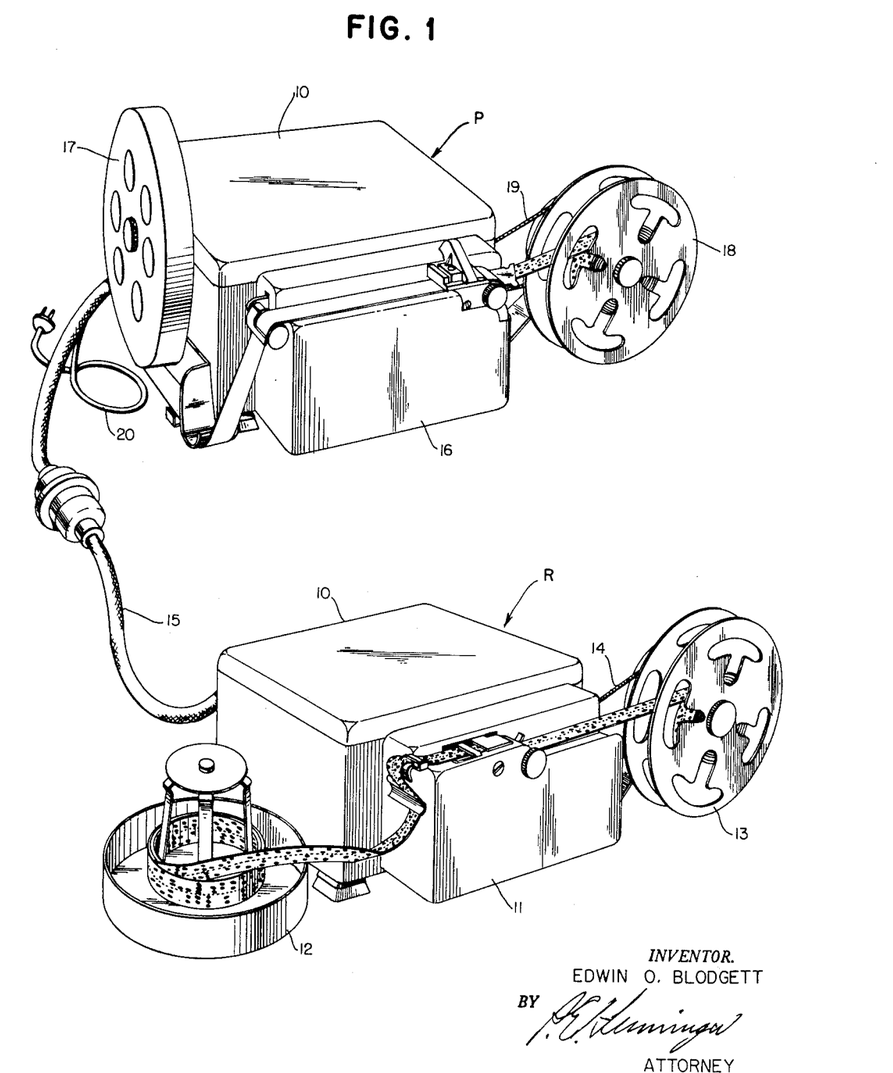
FIG. 1 illustrates motorized tape reader unit embodying the present invention used by way of example in association with an electrically interconnected motorized tape punch unit.

Other objects and advantages of the invention will appear as the detailed description proceeds in the light of the accompanying drawings forming a part of this application and in which:

FIG. 1 illustrates a punched tape reader unit R, embodying the present invention, which derives coded-information recorded on a punched tape and supplies such information to a tape punch unit P to re-record the information in a new punched tape.

The reader and punch units here illustrated both are of the motorized type having a motorized housed assembly 10, hereinafter described in detail. The reader motorized assembly includes a motor which is mechanically connected through an electromagnetically controlled clutch to drive a punched tape reader structure 11 operating to read the information recorded on a punched tape. To facilitate handling long lengths of such tape, a rotatable tape reel 12 receives the roll of tape to be read, and the tape after passing through the reader structure 11 is wound onto a take-up reel 13 driven by a spring belt 14 from the drive shaft of the motorized assembly 10.

This motorized reader unit R reads the information recorded on the tape and transmits it by means of an electrical cable 15 to the motorized punch unit P which similarly includes an electric motor mechanically connected through an electro-magnetically operated clutch to drive a punch structure 16. The punch structure 16 re-records the information by punching a blank tape supplied from a tape reel 17 through the punch unit 16 to a take-up reel 18 driven by a spring belt 19 from the motorized assembly 10.

The constructions of the motorized assembly 10 and tape reader structure 11 of the reader unit R will be shown and described in detail hereinafter. The motorized assembly 10 of the punch-unit P may involve an essentially similar construction, differing only in detail, to that of the reader unit and a suitable construction for the punch structure 16 is shown and described in the aforementioned patent. Each such assembly includes a suitable drive motor belt-connected through an electromagnetically controlled clutch to a drive shaft which drives the reader structure 11 or punch structure 16. Each motorized assembly may include one or more cam actuated contacts mechanically driven from the drive shaft of the assembly, may include one or more circuit control relays, and may also include a power supply for its own energization and if desired for energization of the associated motorized unit. Energization of the power supply and motor of the motorized assembly is conventionally from 110 volt or equivalent power line supply through a flexible power cord 20. Both units may have a cord 20 or one may be provided with a cord 20 and the other receive its supply through the cable 15.

Figure 2:
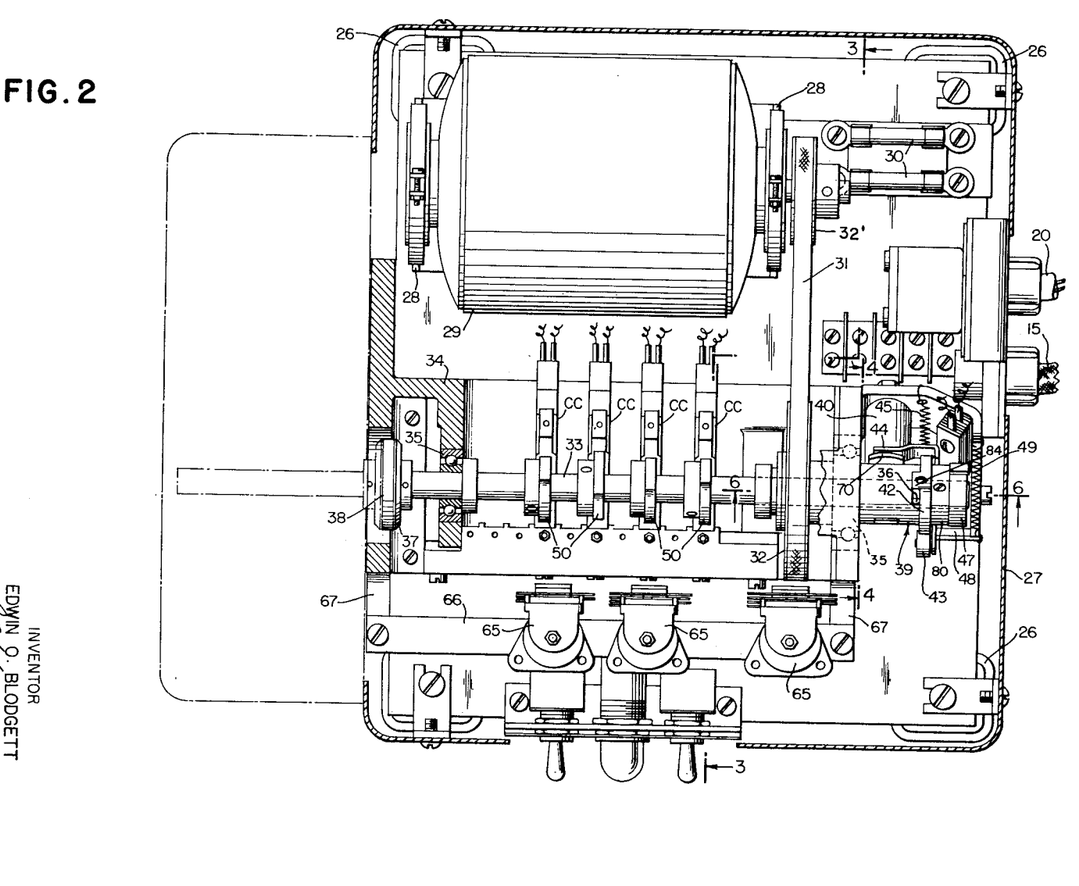
FIGS. 2 and 3 illustrate in respective plan and elevational views the general construction of the motorized drive assembly for the tape reader unit of the invention.
Figure 3:
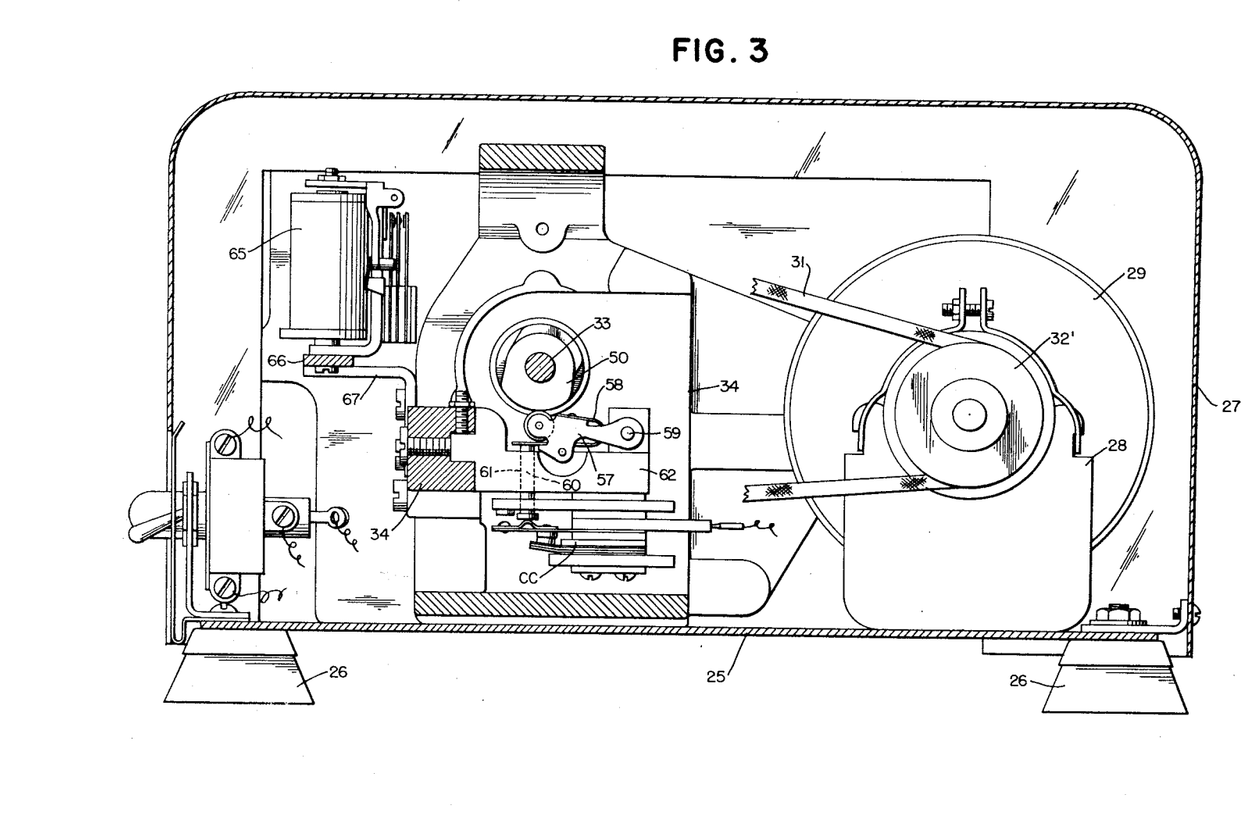

FIG. 2 is a plan view and FIG. 3 an elevational view illustrating the construction of the motorized assembly.

The form of assembly here shown is that for use with a tape reader structure, and differs only in minor details from that used with the tape punch structure. It includes a base plate 25 supported upon resilient feet 26, and is enclosed within a metallic housing 27. Supported on the base plate 25 by support trunnions 28 is an electric drive motor 29 energized through fuses 30 from the power cord 20 or energized through the cable 15 from another similar motorized assembly as will be explained hereinafter. The motor 29 is mechanically connected by a motor pulley 32' and a belt 31 to a further drive pulley 32 rotatably journalled upon a driven shaft 33. The driven shaft 33 is supported in a casting 34 by ball bearings 35, 35, and includes at one end one flange 37 of a flexible coupling 38 through which the associated reader structure or punch structure is driven. The other end of the shaft 33 has positioned thereon a clutch 39 which is controlled by an electromagnet 40, the clutch 39 being driven by the pulley 32 and being effective under control of the electromagnet 40 mechanically to couple the pulley 32 to the driven shaft 33. The clutch 39 has one of two forms depending upon whether the motorized assembly 10 is used with a tape reader structure or a tape punch structure, and both forms of clutch are shown and described in detail hereinafter. A cam 42 is fixed by a set screw to the driven shaft 33, includes two opposed and radially disposed keys 84 engaging individual ones of two elongated circumferential slots 36 in the clutch housing, and is engaged by a cam follower 43. The latter actuates a pivoted armature knock-off arm 44 normally biased by a spring 45 out of engagement with the armature even when the latter is in its energized position. The knock-off arm has an inturned end and is cam-actuated against the bias of the spring 45 to engage the armature, if the latter should remain in its energized position, and thus move it forcibly to its de-energized position.

Fixed to the end of the shaft 33 is a detent 47 engaged by a keeper 48 spring biased into detent engagement by a spring 49.

There are fixed to the shaft 33 in spaced relation along its length a plurality of cams 50 which may vary in number from three to six depending upon the use of the motorized assembly. The cams 50 actuate individual contactors CC used for circuit control purposes, as described in the aforementioned patent, during preselected angles of rotation of the shaft 33 as determined by the contour of any given cam. As shown more clearly in FIG. 3, each of the cams 50 is engaged by a cam follower 57 which is biased into cam engagement by a spring 58, the cam followers being pivoted at 59 and actuating the contacts CC through a push rod 60 slidably mounted in an aperture 61 of a casting 62. The latter provides a unitary assembly which includes a cam follower with associated push rod and contacts, and is itself secured at its forward end to the casting 34 as shown.

When the motorized assembly is used to drive a tape reader structure, a plurality of relays 65 are supported upon a bar 66 secured by brackets 67 to the casting 34.

Figure 4:
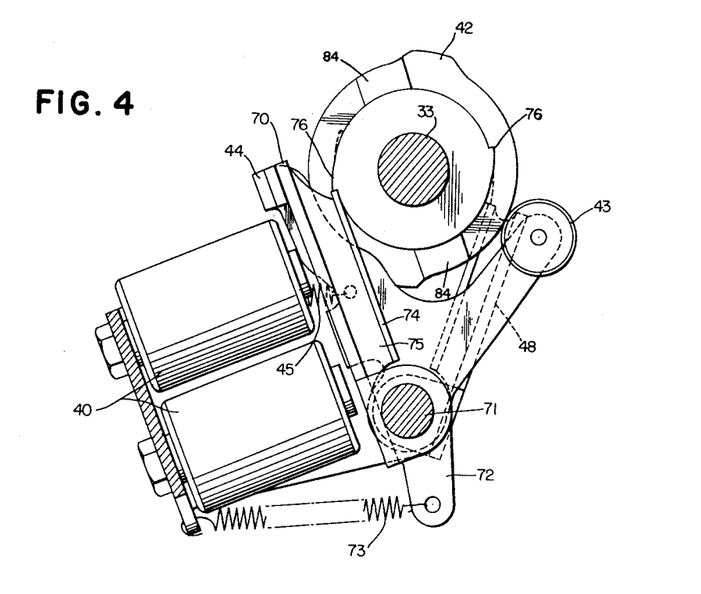
FIGS. 4, 5, 6, and 7 illustrate two forms of clutch construction which may be employed in the motorized assembly.
Figure 5:
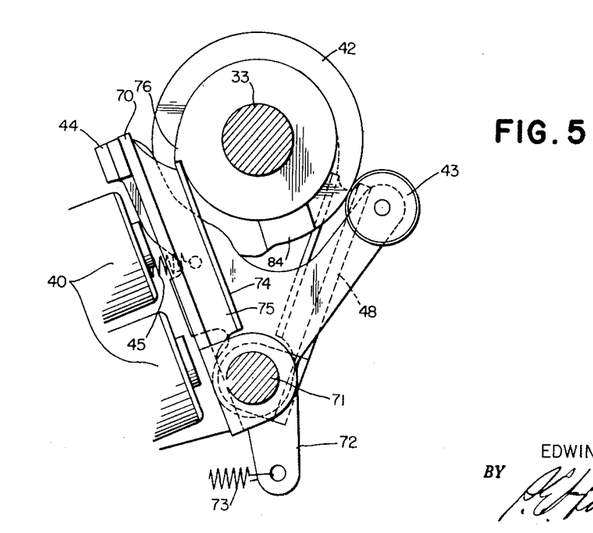
Figure 6:
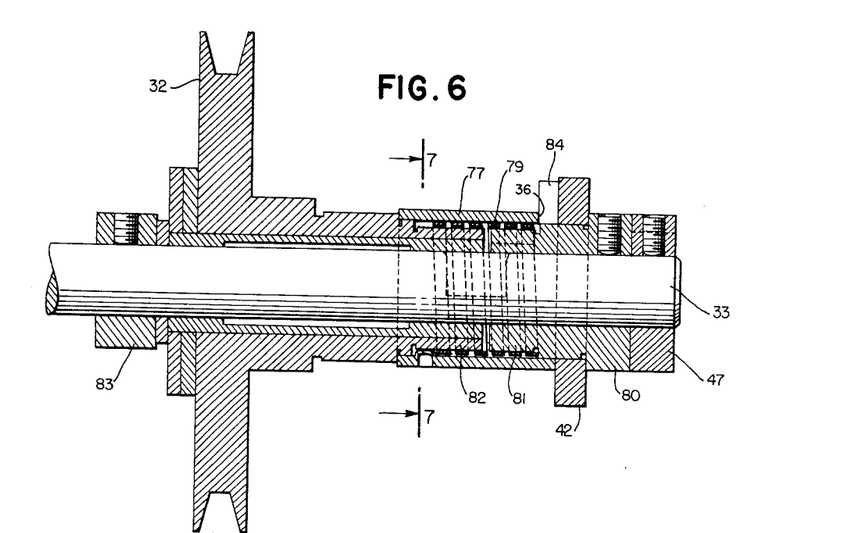
Figure 7:
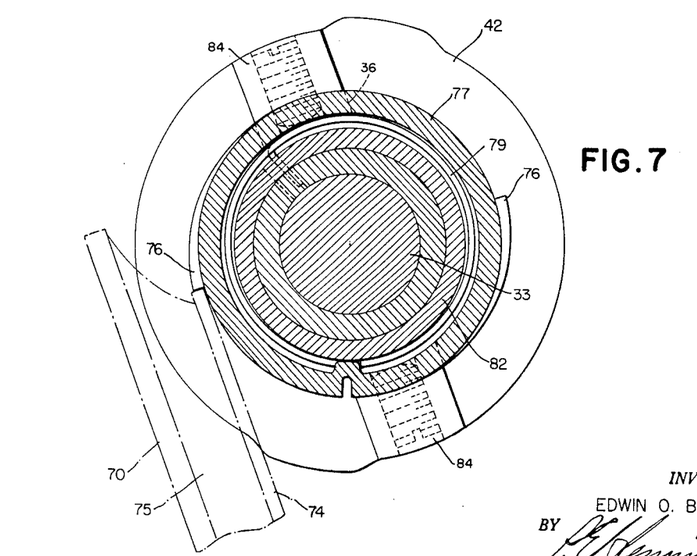

FIG. 4 illustrates the construction of the clutch 39 used in the motorized assembly when the latter drives a tape reader structure, and FIG. 5 the clutch construction when the motorized assembly drives a tape punch structure. FIG. 6 illustrates in cross-section the construction of both forms of clutch, and FIG. 7 is an enlarged cross-sectional view of the clutch used with the tape reader structure. Both forms of clutch are essentially similar with the difference that the tape reader clutch is arranged to be declutched at each 180° of rotation of the driven shaft 33 whereas the tape punch clutch is arranged to declutch at each 360° of rotation of the driven shaft.

Each form of clutch includes an armature 70 pivoted on a fixed shaft 71 and including an extended arm 72 which is engaged by a spring 73 to bias the armature to deenergized position where a detent plate 74, supported from the armature 70 by a bonded resilient rubber block 75, engages clutch detent perturbance 76 provided on the periphery on the clutch housing 77. It will be noted from FIG. 4 that the reader clutch includes two such clutch detent perturbances 76, 76 and that there are two similar detents on the member 47 engaged by the keeper 48. The punch clutch, on the other hand, includes only one detent perturbance 76 and there is only one detent on the member 47 engaged by the keeper 48. As shown more clearly in FIGS. 6 and 7, each form of clutch is otherwise of conventional helical spring construction in which a helical spring 79 has one end engaging an inward projection of the clutch housing 77 and has the other end anchored to a bushing 80 fixed to the driven shaft 33. The bushing 80 has an end 81 extending within the helical spring 79 in opposing relation to the extended end 82 of the pulley 32 which is journalled to rotate freely upon the shaft 33, the pulley being retained in position longitudinally of the shaft by a collar 83 fixed to the shaft.

As mentioned above, the cam 42 includes two keys 84 which engage circumferentially elongated slots 36 in the clutch housing 77 for mechanically limiting the overtravel rotation of the driven shaft relative to the clutch housing. Set screws are provided for adjustably positioning the cam 42 on the bushing 80, and the latter also is provided with set screws by which its angular position may be adjusted relative to the peripheral stop detents 76 on the clutch housing to provide proper clutch action between the stop detents and the driven shaft 33. similarly, the detent 47 is provided with set screws by which angularly to position the zero or home position of the driven shaft 33 relative to the angular declutching position of the clutch 39. In considering briefly the clutch operation, assume that the clutch has just been released by energization of the clutch magnet 40 to move the detent plate 74 out of engagement with a detent perturbance 76. Upon release of the detent perturbance, the clutch housing 77 is rotated forward through a small angle by the tensioned spring 79 and the elongated slots 36 in the clutch housing permits this movement without engaging the rear end of the slot with the key 84 of the cam 42. This movement of the clutch housing 77 permits the helical spring to grip the ends 81 and 82 of the respective bushing 80 and pulley 32 and thereby impart driving force from the pulley 32 to the bushing 80 and driven shaft 33. The clutch housing 77 is subsequently stopped by engagement of the detent plate 74 with a detent perturbance 76, but the momentum of the driven shaft 33 and components fixed thereto causes the shaft 33 to continue movement until the keys 84 strike the forward ends of the slots 36 of the now stationary clutch housing 77. This continued movement of the shaft 33 causes the bushing 80 to unwrap the spring 79 from the ends 81 and 82 of the bushing 80 and pulley 32 thus terminating the driving connection. The stopping action on the shaft 33 is accordingly somewhat cushioned by the deceleration of the shaft as a part of its momentum is converted into tensioning of the helical spring 79. After being brought to a stop by engagement of the keys 84 with the ends of the slots 36, the tensioned spring 79 causes the shaft 33 to rotate backward a slight amount to engage the detent 47 with the keeper 48 at the zero or home position of the driven shaft 33.

The detals of construction of the tape reader structure are shown in FIGS. 8–12 of the drawings. It is driven from the motorized assembly 10 as earlier mentioned, and is conveniently removably mounted rigidly upon the flared end of the motorized assembly casting 34 (as indicated in broken lines in FIG. 2) by machine screws which pass through a base casting 202 of the reader structure and are threaded into the motorized assembly casting 34.

The reader structure is here shown as one used to read a six hole code, and it will be understood that a reader structure for a five hole code could simply omit one of the reading pins while a reader structure arranged to read a code having more than six holes would include the same construction illustrated but with the required larger number of reading pins and associated actuating components.

The tape reader structure includes a plurality of paired electrical contacts 200 which are disposed in opposite rows on a supporting structure 201 mounted on the base casting 202. Inasmuch as the reader structure here described is one for reading or sensing any one of six code holes (or any combination thereof) in the read tape, there are six paired contacts 200 under the control of tape perforations and a seventh contact constituting a tape run-out contact RTC which will be described in greater detail hereinafter. The contacts in the oppositely disposed rows are arranged on the supporting structure 201 in staggered relation so that they may be individually controlled by interposer mechanism which will be more fully described at a later point. Each pair of contact devices includes fixed conductive strips 203 having contact points at their lower ends and also includes resiliently movable conducting strips 204, each of which carries a contact point in registration with the contact point or points on associated ones of the strips 203. Each resilient conducting strip 204 normally is forcibly moved against its own resiliency to close one of its associated contacts but its resiliency tends to move it to open this contact and close the other of its associated contacts. The strip 204 is restrained against doing so, except when a corresponding tape perforation appears, by means of an offset contact lever 205 which is mounted for a limited swinging movement on a pivot shaft 206 (FIG. 10) forming part of the supporting structure 201. Each of the contact levers 205 has a free end 207 which when moved outwardly causes the contact operating end of the lever 205 also to move outwardly. The contact operating end of each such lever has pivoted thereto a short outwardly extending insulating link 208 which is notched or apertured to engage an outwardly extending pin 209 of associated ones of the resilient contact strips 204. As a result of this structure, when the free ends 207 of the contact levers 205 are moved outwardly, the opposite ends of the levers also move outwardly and cause the contact points of its associated contacts to open certain contacts and close others as noted above.

The contact levers 205 are guided in their movement by a pair of guide combs 210, and the movement of these levers is partially under control of a pair of contact lever bails 211, one such bail being associated with each row of contact levers and adapted to engage the free ends 207 thereof. Thus, when the contact bail levers 211 are moved toward each other, any contact lever which is at such time otherwise free will permit its associated resilient contact strips 204 to move inwardly to close the inner contacts thereof while opening the outer contacts thereof. The contact lever bail assembly includes a pair of yoke-like members 212, each comprising a pair of laterally spaced arms 213 interconnected by the contact lever bail 211. One end of each arm is pivoted on the pivot shaft 206, and the other end of each has mounted thereon a roller 214. The contact lever bail assemblies are urged toward each other under the influence of the contact levers 205 and resilient contact springs 204, but they are kept in normally separated position by means of interposer bail studs 215 which are adapted to move between the rollers 214 at each end of the assembly. When the studs 215 are disposed between the rollers 214, the contact lever bail assembly is separated, the contact lever bails 211 are in contact with the free ends 207 of the contact levers 205, and as a consequence the inner contact points of the contacts 203, 204 are opened while the outer contacts thereof are closed.

The studs 215 are carried by an interposer bail assembly 216 which in turn is pivoted on a pivot shaft 217. The interposer bail assembly 216 includes a pair of spaced side arms on the free end of each of which is located the stud 215 and from which the latter projects into position between the rollers 214. An interposer bail 219 interconnects the side arms of the interposer bail assembly and this bail is adapted to overlie and to control a series of interposers as will more fully appear hereinafter. Furthermore, the interposer bail assembly has attached thereto an interposer bail arm 220 by means of which the forwardly projecting arms 216 may be rocked about the pivot shaft 217 on which they are mounted. The free end of the interposer bail arm 220 has a cam follower 221 mounted thereon and adapted to operate in contact with an interposer bail cam 222 which is fixed to a drive shaft 223. The drive shaft 223 has fixed on one end a flange 224 which forms one element of a flexible coupling 38 by which the shaft 223 is driven from the driven shaft 33 of the motorized assembly earlier described.

Figure 8:
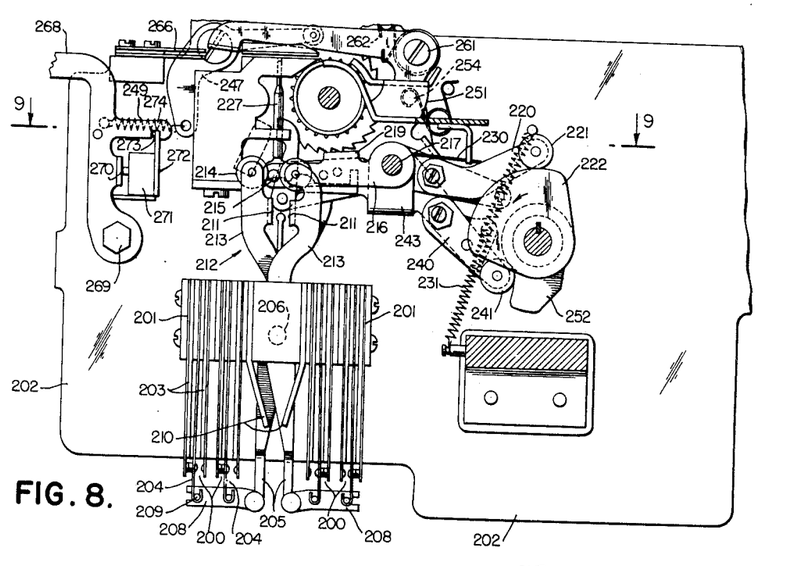
FIGS. 8–12 illustrate the construction of a tape reader structure itself.
Figure 9:
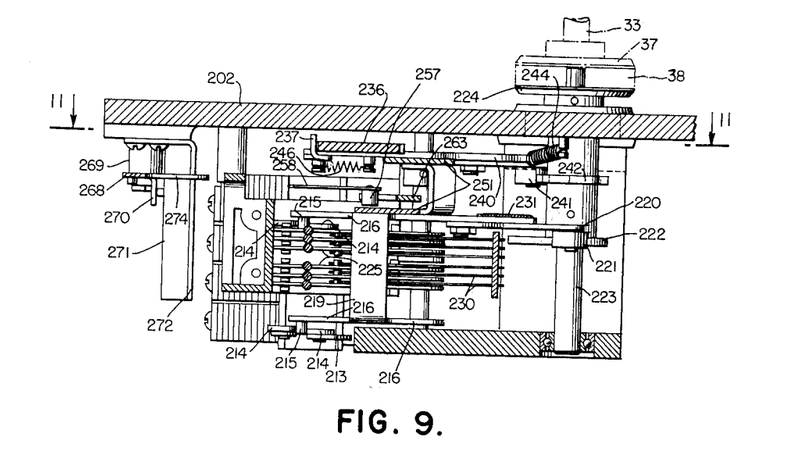
Figure 10:
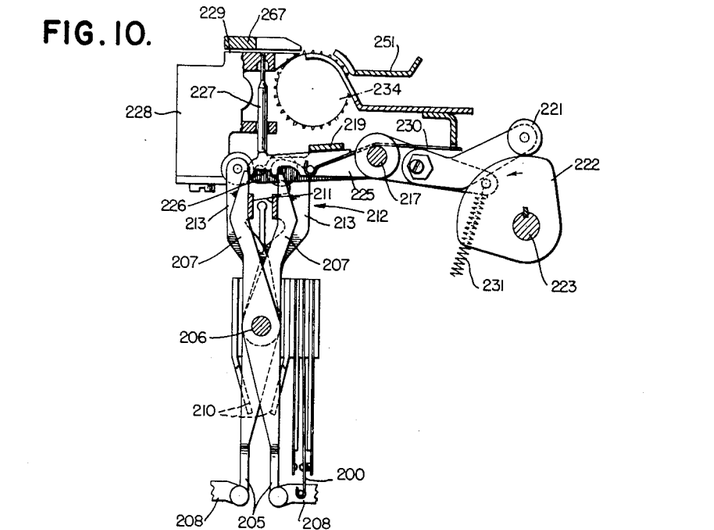
Figure 11:
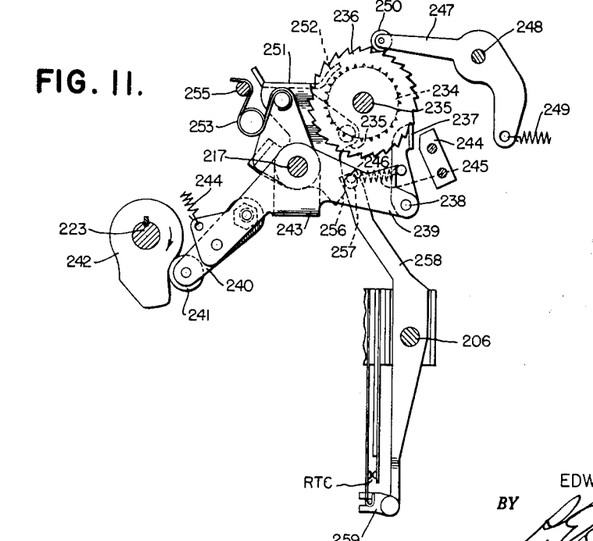

The operation of the tape controlled contact assemblies is under the ultimate control of a series of interposer arms 225 (FIG. 8) and attached tape reading pins, one such arm being provided for each tape controlled contact lever 205. The interposer arms 225 are freely pivoted on the shaft 217 on which they are mounted, and each consists of a lever having a pair of interposer shoulders 226 (FIG. 10) formed at the free end thereof. One shoulder 226 of each interposer arm is associated with the free end 207 of its corresponding contact lever 205. In the inoperative or non-reading position of the reading pins, the interposer arms are positioned as shown in FIGS. 8 and 10 with one of its shoulders 226 in the path of movement of the end 207 of its associated contact lever 205 but normally slightly out of engagement therewith. It will be seen, therefore, that even though the contact lever bails 211 are released, each contact lever 205, the interposer of which is in blocking position, will be restrained and consequently its associated contacts will remain open.

Coupled to each interposer arm is a reading pin 227 which is guided for reciprocating movement in a reading pin guide block 228. The path of the reading pins 227 intersects a tape feed throat 229 in the guide block 228. As a perforated tape is intermediately fed through the tape feed throat 229, the reading pins 227 are allowed to come into light contact therewith by reason of the fact that each interposer arm 225 is under the influence of a light spring 230. The tension of the spring 230 is insufficient to cause any damage to a control tape being read. However, the spring tension is sufficient to cause a reading pin 227 to enter a tape perforation which occurs in alignment with such reading pin. When this relationship is present, the corresponding reading pin 227 will enter the tape perforation and thus cause the interposer arm 225 to swing on its pivot shaft 217 sufficiently to withdraw the blocking interposer shoulder 226 from the path of the upper end 207 of its associated contact lever 205. Under these conditions and when the contact lever bails 211 are moved inwardly away from the free ends 207 of the contact levers 205, a contact lever thus freed will move sufficiently to close its associated contact points. In the absence of a perforation in the tape corresponding to the position of a particular one of the reading pins 227, the reading pin will rest lightly on the under surface of the tape and thus prevent the associated interposer arm 225 from moving out of the path of the associated contact lever 205, thereby blocking such lever against movement and preventing the operation of its associated contacts. Whenever the interposer bail 219 is in its depressed position, the interposer arms 225 will be held in nonreading position. It will be noted that the interposer bail 219 overlies and is adapted to contact the upper edge of all of the aligned interposer arms 225.

Figure 13:
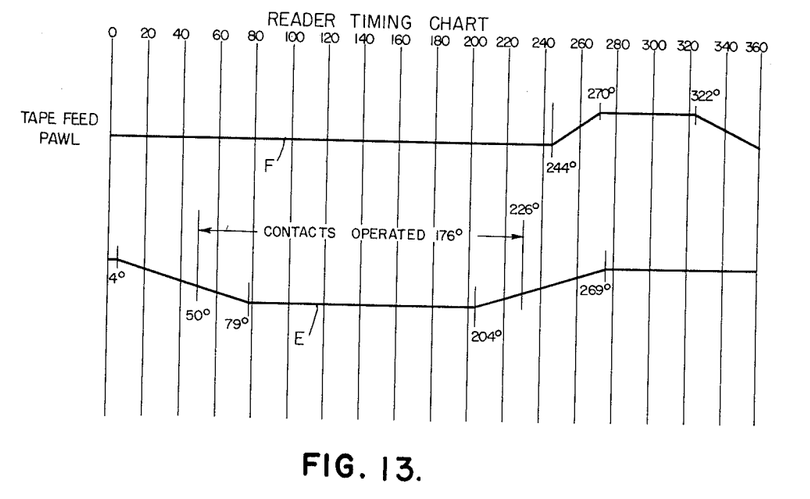
FIG. 13 graphically represents certain timing relationships involved in the operation of the tape reader unit.

The interposer arms 225, and consequently the reading pins 227, are restrained in non-reading position by the interposer bail 219 until the interposer bail arm 220 is permitted to drop by the cam 222 as the latter is driven from the motorized assembly through the driven shafts 33 and 223. The interposer bail arm 220 drops under the influence of a tension spring 231 connected to one end of the lever 225 which maintains the cam follower 221 in contact with the cam 222. As the interposer bail arm 220 and interposer bail assembly 216 thus move clockwise about the pivot shaft 217, the interposer bail 219 is raised and the interposers 225 are permitted to rise under the influence of their respective springs 230 should their associated reading pin 227 enter any tape perforation presented by the tape in alignment with the reading pin. This permits movement of the associated contact lever 205 in the manner previously pointed out. As the interposer bail cam 222 continues to rotate, a point is reached on its contour where it moves the interposer bail arm 220 and interposer bail assembly 216 counterclockwise about its pivot shaft 217. In the final position of rotation of the bail assembly 216, the interposer bail 219 restores the interposers 225 to their normal position at which the reading pins 227 are out of contact with the tape, the interposer arms then being in position to latch the contact levers 205 and the latter being separated by contact of the contact lever bails 211 by reason of the interposition of the interposer bail studs 215 between the rollers 214. This completes a cycle of operation of the reading pin sensing action, which beings at 4° and ends at 269° of the reader cycle as indicated by curve E of FIG. 13, and succeeding such cycles occur for each revolution of the interposer bail cam 222. It will be recalled from the description of the motorized assembly that the motorized assembly clutch controls cycles of operation of the driven shaft 33, and it will be apparent that this in turn controls cycles of operation of the cam 222 and thus of the reader structure.

The perforations in the tape are arranged in transverse rows that are equally spaced, and the tape is moved through the reading throat 229 in step-by-step progression such that successive rows of perforation will present themselves in registry with the reading pins 227. For the purpose of achieving a regular feeding of the tape through the reading zone, there is provided a tape feeding mechanism which is shown more clearly in FIG. 11 of the drawings. The tape is provided along its length with sprocket holes which are engaged by the teeth of a tape feed pin wheel 234. The pin wheel 234 is fixed to a shaft 235 which is supported for rotation in ball bearings as indicated and is rotated by a feed ratchet wheel 236. The latter has circumferential teeth which are periodically engaged by a feed pawl 237 by which to rotate the ratchet wheel and pin wheel 234 to effect tape feed in step-by-step manner. The feed pawl 237 is pivoted at 238 on one end of a feed pawl operating lever 239. The operating lever 239 is mounted on the pivot shaft 217 for limited rocking movement thereabout, and includes an arm 240 having on its end a cam follower roller 241 adapted to contact a tape feed cam 242 mounted for rotation with the driven shaft 223. The feed pawl operating lever 239 is mechanically connected to the arm 240 by a transverse yoke 243 to provide a feed pawl assembly. The feed pawl 237 is moved through its feeding stroke by actuation of the arm 240 from the cam 242, and is returned by action of a tension spring 244, connected at one end to the arm 240 and at its opposite end to a stud on the casting 202. A stop member 244 secured to the casting 202 engages the feed pawl 237 at the upper limit of movement of the latter to wedge or jam the feed pawl against the teeth of the ratchet wheel 236 and thus assure a positive stop of the latter without overtravel. The feed pawl 237 is continuously biased into contact with the teeth of the ratchet wheel 236 by a spring 245 connected between the pawl 237 and a pin 246 on the lever 239. Each tape feed operation begins at 244° of the reader cycle, just after the reading pins are withdrawn from the tape, and ends at about 360° as graphically indicated by curve F of FIG. 13.

A feed ratchet wheel detent 247 is pivoted at 248 on a stud fixed to the support casting 202, and is biased counterclockwise by a tension spring 249 to engage a roller 250 carried on the end of the arm 247 with the teeth of the ratchet wheel 236. This detent structure provides a stabilizing action for the rotary operation of the feed ratchet wheel and consequently of the tape feed pin wheel 234.

Figure 12:
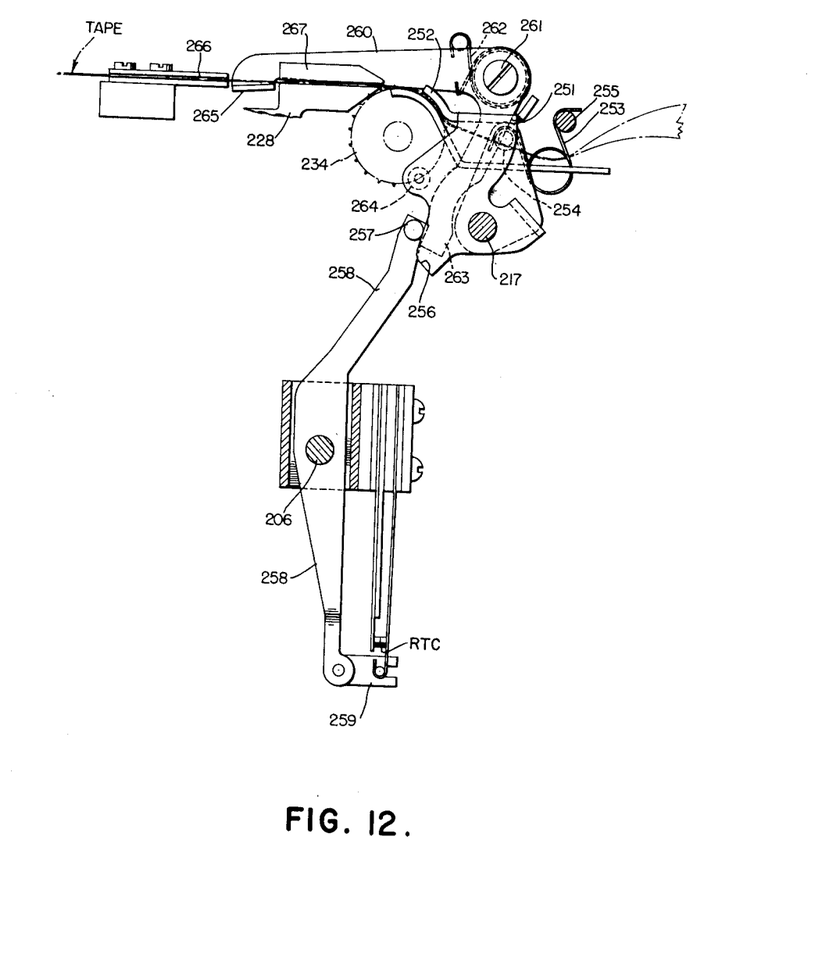

In order that the tape may be held in cooperative relation with the pin wheel 234, a tape holddown arm 251 is provided as shown more clearly in FIGS. 8 and 12. This arm has an arcuate end portion 252 positioned in spaced proximity to the pin wheel 234, serving the purpose of holding the tape in contact with the feed pins of the pin wheel. To permit threading of the tape into the reader unit, the tape hold-down arm 251 is pivoted for rocking movement on the pivot shaft 217 and is retained in either its tape hold-down position or the tape loading position by the action of an overcenter spring 253 extending between a pin 254 on the arm 251 and a stud 255 on the casting 202. The hold-down arm 251 includes a camming surface 256 which is engaged by a stud 257 provided on the upper end of a contact lever 258. The latter is connected at its lower end by an insulating link 259 to a contact RTC. With the hold-down arm 251 in its tape hold-down position, the movable element of the contact RTC biases the arm 258 to the position shown. Upon movement of the hold-down arm 251 counterclockwise to its tape loading position, the camming surface 256 of the hold-down arm moves the lever 258 clockwise by engagement of the stud 257 with the camming surface 256 thereby to open the contact elements of the contact RTC. This structure enables the tape reader unit to be maintained inoperative so long as the contacts RTC remain open by virtue of the positioning of the tape hold-down arm 251 in its tape loading position rather than its tape reading position.

The reader structure also includes a tape run-out arm 260 for sensing the presence or absence of tape to open the contacts RTC and thus enable the operation of the tape reader unit to be halted when the end of the tape is reached. The arm 260 is pivoted on a stud 261 of the base casting 202 and is normally biased to move clockwise by a spring 262. A dependent portion 263 of the arm engages the stud 257 of the contact lever 258 whenever the arm 260 moves under action of its spring 262 in a clockwise direction, thus opening the contacts RTC. The tape hold-down arm 251 includes a stud 264 which, upon movement of the arm 251 to the tape loading position, engages the end portion 263 of the arm 260 and moves the latter counterclockwise to position a hooked or bent over end portion 265 of the arm 260 below the plane of the tape passing through the reader. Thus while tape is being loaded into the reader, the hooked or bent end portion 265 of the arm 260 is positioned below the tape, and is moved by the spring 262 upward to engage the undersurface of the tape upon return of the tape hold-down arm 251 to its tape hold-down position shown. The tape passes between the tape guides 266 and 267 which restrain the tape to move through the reader structure in a generally planar manner at the region of the hooked end 265 of the arm 260. However, as soon as the end of the tape passes out from under the guide 266 the tape no longer is able to prevent the arm 260 from moving clockwise under the action of the spring 262. This movement of the arm 260 and its dependent portion 263 actuates the lever 258 to open the contacts RTC and terminate the operation of the reader unit.

It will be seen from FIG. 1 that the tape enters the reader unit over an arrangement of guide members. The upper one of these guide members is supported on the end of an arm 268 (FIGS. 8 and 9) which is pivoted on the end of a base casting stud 269 and has an intermediately positioned flange 270 for operating a switch 271 supported on a bracket 272 from the base casting 202. The range of movement of the arm 268 is limited by a slot 273 provided on an extending portion 274 of the arm 268 and positioned to engage the upper edge of the bracket 272. This arrangement is one for terminating the operation of the reader unit in the event for any reason of excessive tension of the tape entering the reader unit. To this end, the arm 268 is normally biased counterclockwise as seen in FIG. 8 by the switch plunger or actuator of the switch 271 in which position of the arm 268 the contacts of the switch are closed. Should the tension of the incoming tape become excessive for any reason, it causes the arm 268 to move clockwise and thereby actuate the switch 271 to cause the latter to open its contacts. This switch will enable the operation of the reader unit to be halted by reason of such excessive tape tension.

It will be apparent from the foregoing description of the reader unit that the tape controlled contacts 200 are permitted to operate when their associated reading pins 227 enter corresponding perforations in the tape which is fed in steps through the reader structure. Since several sets of contacts are under control of each contact lever 205, the aggregate force of the resilient contact strips 204 on the contact lever is appreciable, but it will be apparent that the interposer structure sustains this force and avoids transmission thereof to the reading pins. Even though the reading pins are the ultimate control instrument for the pin controlled contacts 200, there is only the force of the interposer springs 230 imposed on the reading pins 227 with the result that the reading pins offer no obstruction to the even passage of the tape through the reading zone nor do they tend to make perforations in the tape. The tape may consequently be used repeatedly without fear of damage or undue wear by contact with the reading pins.

While a specific form of the invention has been described for purposes of illustration, it is contemplated that numerous changes may be made without departing from the spirit of the invention.

I claim:

1. A code reader comprising, code reading means having a cyclic reading operation of which each cycle is initiated and completed by a code non-reading state of said reading means and includes a partial-cycle code-reading state thereof, electrical circuit control means included in said reading means and effective during each said code-reading state thereof concurrently to complete various combinations of plural electrical circuits corresponding to individual ones of various combinations of the code bits appearing in each code-bit group read from a record medium, transport means having a cyclic operation for moving said record medium past said reading means to derive by operation of said electrical circuit control means informataion recorded in said medium, a drive shaft mechanically coupled to drive each of said reading and transport means, a source of motive power, and quick-acting clutch means for effecting mechanical driving connection and disconnection between said motive power source and said drive shaft selectively at each of said code non-reading and code-reading states of said reading means.

2. A code reader comprising, code reading means having a cyclic reading operation of which each cycle is initiated and completed by a code non-reading state of said reading means and includes a partial-cycle code-reading state thereof, electrical circuit control means included in said reading means and effective during each said code-reading state thereof concurrently to complete various combinations of plural electrical circuits corresponding to individual ones of various combinations of the code bits appearing in each code-bit group read from a record medium, transport means having a cyclic operation for moving said record medium past said reading means to derive by operation of said electrical circuit control means information recorded in said medium, a drive shaft mechanically coupled to drive each of said reading and transport means, a source of motive power, and an electromagnetically-operated helical-spring clutch for effecting mechanical driving connection and disconnection between said motive power and said drive shaft selectively at each of said code non-reading and code-reading states of said reading means.

3. A code reader comprising, code reading means having a cyclic reading operation of which each cycle is initiated and completed at a 0° cyclic code non-reading position of said reading means and includes a 180° cyclic code-reading position thereof, electrical circuit control means included in said reading means and effective at each said 180° cyclic position thereof concurrently to complete various combinations of plural eletrical circuits corresponding to individual ones of various combinations of the code bits appearing in each code-bit group read from a record medium, transport means having a cyclic operation for moving said record medium past said reading means to derive by operation of said electrical circuit control means information recorded in said medium, a drive shaft mechanically coupled to drive each of said reading and transport means, a source of motive power, and an electromagnetically-operated 180° helical-spring clutch for effecting mechanical driving connection and disconnection between said motive power source and said drive shaft selectably at each of 180° positions of said shaft corresponding to said 0° and 180° cyclic positions of said reading means.

4. A punched-tape code reader comprising, means including a plurality of code reading pins reciprocated during each operating cycle between code hole sensing and non-sensing positions and responsive to code sensing positioning of said reading pins for actuating to closed-circuit state electrical contacts individual to each of said reading pins whenever said each reading pin senses the presence of a code hole in the tape being read, thereby to derive by the positioning of said contacts punched-taped recorded information, means having a cyclic operation for moving a code-punched tape past said reading pins, a drive shaft mechanically connected to drive each said means through operating cycles thereof, a source of motive power, and a reader-operating-cycle control clutch for effecting mechanical driving connection and disconnection between said motive power source and said drive shaft at each of said code sensing and non-sensing positions of said reading pins.

5. A punched-tape code reader comprising, means including a plurality of code reading pins reciprocated during each operating cycle between code hole sensing and non-sensing positions and responsive to code sensing positioning of said reading pins for actuating to closed-circuit state electrical contacts individual to each of said reading pins whenever said each reading pin senses the presence of a code hole in the tape being read, thereby to derive by the positioning of said contacts punched-taped recorded information, means having a cyclic operation for moving a code-punched tape past said reading pins, a drive shaft mechanically connected to drive each said means through operating cycles thereof, a source of motive power, and a partial-operating-cycle control clutch mechanically interconnecting said source and said drive shaft but controllable to complete and interrupt said driving connection at each of predetermined points in each said operating cycle of said reading means corresponding to said code-hole sensing and non-sensing positions of said reading pins.

6. A punched-tape code reader comprising, means including a plurality of code reading pins reciprocated during each operating cycle between 0° code-hole sensing and 180° non-sensing cyclic positions and responsive to code sensing positioning of said reading pins for actuating to closed-circuit state electrical contacts individual to each of said reading pins whenever said each reading pin senses the presence of a code hole in the tape being read, thereby to derive by the positioning of said contacts punched-taped recorded information, means having a cyclic operation for moving a code-punched tape past said reading pins, a drive shaft mechanically connected to drive each said means through operating cycles thereof, a source of motive power, and a 180° quick-acting clutch for effecting selective mechanical driving connection and disconnection between said motive power source and said drive shaft at each of said code sensing and non-sensing positions of said reading pins.

7. A code reader comprising, code reading means having a cyclic reading operation of which each cycle is initiated and completed at a 0° code non-reading cyclic position of said reading means and includes a code-reading intermediate cyclic position thereof, electrical circuit control means included in said reading means and effective during each said code-reading intermediate cyclic position thereof concurrently to complete plural various combinations of electrical circuits corresponding to individual ones of various combinations of the code bits appearing in each code-bit group read from a record medium, transport means having a cyclic operation for moving said record medium past said reading means to derive by operation of said electrical circuit control means information recorded in said medium, a drive shaft mechanically coupled to drive each of said reading and transport means, a source of motive power, and selectably operated quick-acting clutch means for effecting mechanical driving connection and disconnection between said motive power source and said drive shaft selectably at said code-non-reading zero cyclic position of said reading means and at said code-reading intermediate cyclic position of said reading means.

8. A punched-tape code reader comprising, means including a plurality of code reading pins reciprocated during each operating cycle between 0° code-hole sensing and 180° non-sensing positions and responsive to code sensing positioning of said reading pins for closing electrical contacts individual to each said pin and thus by combinational open and closed states of said contacts at each of successive 180° positions of said reading pins to derive each of successively recorded items of punched-taped recorded information, means having a cyclic operation for moving a code-punched tape past said reading pins, a drive shaft mechanically connected to drive each of said means through operating cycles thereof, a source of motive power, and quick-acting clutch means for effecting mechanical driving connection and disconnection between said motive power source and said drive shaft selectably at said 0° cyclic non-sensing position of said reading pins and at said 180° cyclic sensing position of said reading pins.

References Cited in the file of this patent
UNITED STATES PATENTS

| | | |
|---|---|---|
| 2,475,432 | Marihart | July 5, 1949 |
| 2,477,832 | Schuler | Aug. 2, 1949 |
| 2,562,251 | Wockenfuss | July 31, 1951 |
| 2,638,270 | Jones | May 12, 1953 |
| 2,692,729 | Guttridge et al. | Oct. 26, 1954 |
| 2,885,042 | Frechette | May 5, 1959 |